July 6, 1965    J. J. GUERRERO    3,192,623
CULINARY KNIFE
Filed July 22, 1963
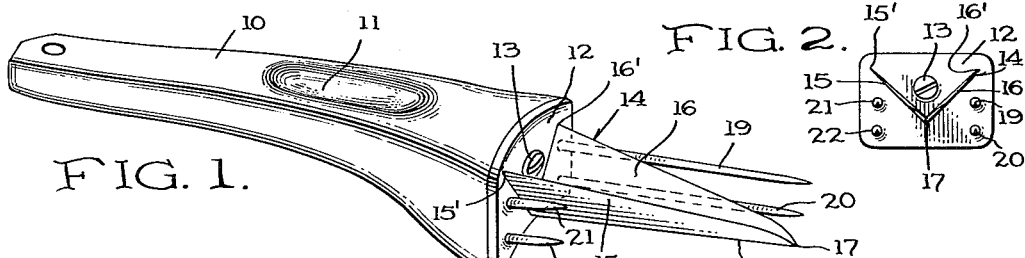
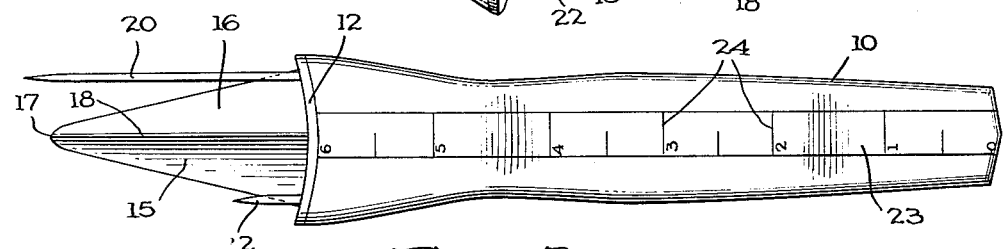
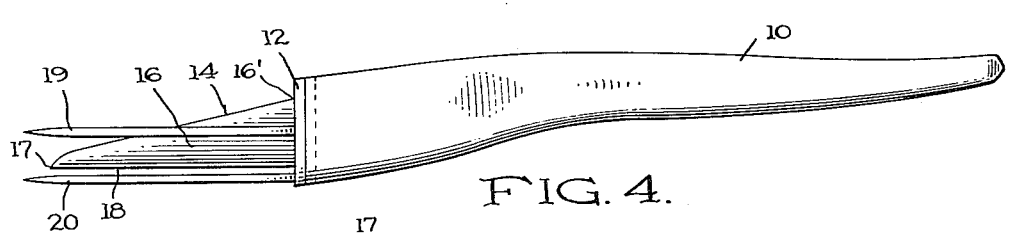
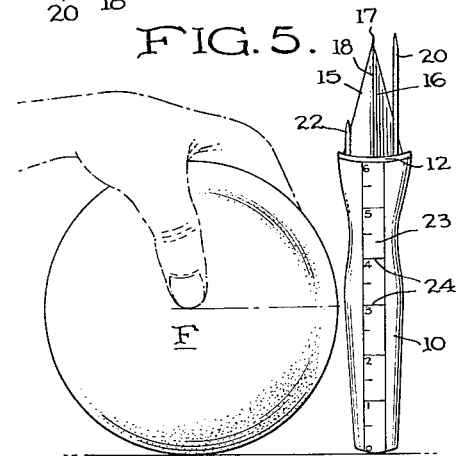
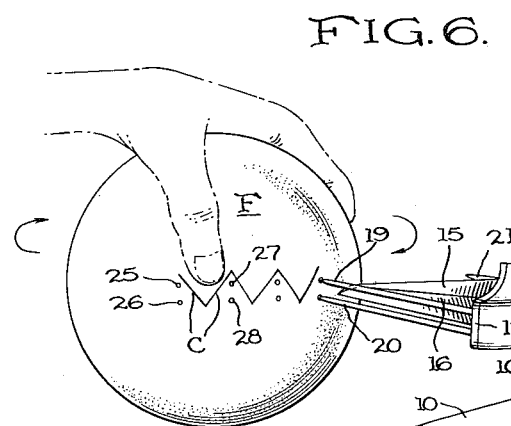
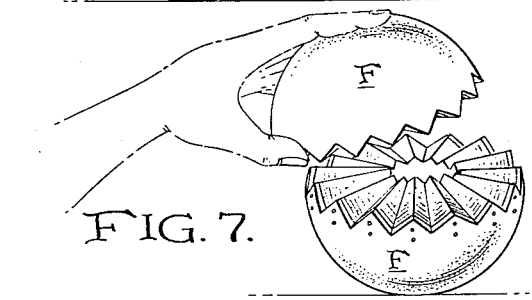
JOHN J. GUERRERO
BY *Cameron, Kerkam & Sutton*
ATTORNEYS

United States Patent Office 3,192,623
Patented July 6, 1965

3,192,623
CULINARY KNIFE
John J. Guerrero, 1214 7th St., Los Alamos, N. Mex.
Filed July 22, 1963, Ser. No. 296,753
3 Claims. (Cl. 30—24)

This invention relates to an improved, angularly bladed knife designed to be used in halving fruit or melons to separate them into two equal, hemispherical sections while simultaneously providing the cut edges of the sections with pleasing, angular and equal flutings.

The invention contemplates a knife which may be readily used by an inexperienced operator to artistically cut and separate into equal halves, as aforesaid, fruit and melons.

The invention provides paired prong or guide means disposed at each side of the angular blade of the knife which serve as indexing or guide means for the operator whereby an inexperienced person may separate a fruit or melon into two equal, hemispherical sections while simultaneously providing the edges with equal, angular fluted configurations.

Previously, only an experienced operator could so cut a grapefruit or melon with a conventional straight-bladed knife and a considerable period of training was necessary before any facility was developed by the operator.

It is therefore a primary object of this invention to evolve an angularly bladed knife provided with guide means disposed laterally of the blade whereby an operator can with facility and rapidity cut a fruit or melon into equal halves, simultaneously providing the edges of each half with a series of equal, angular and contiguous cuts to enhance the appearance of the cut fruit or melon.

It is another object of this invention to provide such a knife with laterally disposed guide prong means whereby an inexperienced operator can use the knife readily.

It is a further object of this invention to provide such a knife of such dimensions as will make it susceptible of use on various types of fruit and/or melons of widely varying diameters.

Other and further objects of this invention will become apparent as this specification proceeds.

In the drawings, FIG. 1 is a perspective view, partially in phantom, and taken from the side, of a cutting implement made in conformity with the present invention;

FIG. 2 is a front view of the implement shown in FIG. 1;

FIG. 3 is a bottom view of the implement;

FIG. 4 is a side view thereof;

FIG. 5 is a perspective view of the knife and handle scale in use to measure the diameter of a fruit or melon to be cut;

FIG. 6 is a perspective view of the manner of centering the knife blade and prongs on the equator of a fruit or melon being cut;

FIG. 7 is a perspective view of a fruit completely severed by the knife; and

FIG. 8 is a partial perspective view of an alternative embodiment of the blade.

In the drawings, 10 designates the handle for the knife, which is preferably rearwardly reduced and tapered for easy grasping by the hand of the operator. Handle 10 is provided in its upper, forward surface with a thumb recess 11 for receiving the thumb of the operator, to insure proper positioning of the knife blade during the cutting operation.

Base plate 12 is affixed to the forward face of handle 10 as by screw 13. As shown, base plate 12 is preferably slightly concaved, or inwardly curved. Rectangularly affixed to plate 12, as by soldering, is a forwardly reduced, angular cutting blade 14 composed of triangular lateral blade segments 15 and 16 which are joined along a common base line 18 at an angle of about 90°. Blade segments 15 and 16 are preferably triangular in shape, as shown, and are forwardly reduced to a point 17 as their forward extremity. It will thus be seen that when the handle 10 is grasped by an operator, with his thumb disposed flush in thumb recess 11, the open V of blade 14 will be upwardly disposed.

Blade 12 is preferably formed by bending a triangular piece of thin, resilient steel along its median line 18 to form two distinct triangular blades 15 and 16 disposed at an angle of about 90° to each other, each blade being sharpened along its upper edge.

A pair of elongate, pointed, parallel prongs 19 and 20 are preferably rectangularly affixed to base plate 12 at the left side of blade 14 outwardly therefrom in vertical alignment beneath the rear, left extremity 16' thereof. Prongs 19 and 20 are disposed in a vertical plane parallel to the vertical plane through the longitudinal axis of blade 14. Upper prong 19 is preferably disposed laterally of blade segment 16 in the plane of its median line and extends outwardly therefrom an appreciable distance beyond the penetrating point 17 of blade 14. Lower elongate prong 20 is disposed beneath upper prong 19, parallel thereto, and lying in the same vertical plane therewith and is preferably disposed in a plane beneath and parallel to base line 18 of blade 14. Lower prong 20 is of the same length as upper prong 19 and extends outwardly an appreciable distance beyond penetrating point 17 of blade 14.

At the opposite, or right side of blade 14, outwardly of blade segment 15 and also rectangularly affixed to base plate 12 are parallel, reduced prongs 21 and 22, disposed in a vertical plane passing through the right hand, rear extremity 15' of blade segment 15, parallel to the vertical plane of elongate prongs 19 and 20 and aligned in the same horizontal planes with prongs 19 and 20, respectively.

Thus, upper reduced prong 21 is disposed outwardly of blade segment 15, parallel to its median line, and prong 22 is disposed parallel to prong 20, beneath and parallel to lower edge 18 of blade 14. Reduced prongs 21 and 22 are preferably of larger diameter than elongate prongs 19 and 20 and are, as aforesaid, laterally aligned in parallel in the same horizontal planes therewith, respectively. Prongs 21 and 22 are preferably of approximately one-fifth the length of elongate prongs 19 and 20, for a purpose hereinafter more fully to be discussed.

Thus, upper prongs 19 and 21 are disposed in the horizontal median plane of blade 14 and lower prongs 20 and 22 lie in a horizontal plane parallel to the plane of prongs 19 and 21 and lying beneath lower edge 18 of blade 14.

The upper edges of blade segments 15 and 16 of blade 14 are preferably sharpened, which sharpening extends outwardly along the upper edges of both segments 15 and 16 to penetrating point 17 thereof.

In an alternative embodiment, as shown in FIG. 8, the upper edges of blade segments 15 and 16 are sharpened and serrated.

As aforesaid, elongate prongs 19 and 20 extend outwardly beyond the penetrating point 17 of blade 14 an appreciable distance. Upper elongate prong 19 and shortened prong 21 lie in the same horizontal plane and are parallel to each other. The same is true of lower elongate prong 20 and lower shortened prong 22, which are aligned in the same horizontal plane parallel to each other beneath the lower median edge 18 of blade 14.

Shortened prongs 21 and 22 are designed as the "guide means" for prongs 19 and 20, as will hereinafter be discussed at more length.

Longitudinally affixed to the lower face of handle 10 is a ruler member 23, preferably 6 inches in length, and bearing appropriate 1 inch designations 24, extending longitudinally thereof, for a purpose hereinafter to be discussed.

It will be seen from FIG. 5 of the drawings that prior to the cutting operation the knife is preferably positioned vertically adjacent the fruit to be cut, with the ruler member 23 turned toward the operator whereby he can readily measure the diameter of the fruit to be cut. The operator then grasps the fruit F from above, as shown in FIGS. 5 and 6, with his left hand, and with the tip of his left thumb marks the equator thereof. Holding his thumb in this position, the operator then grasps the knife handle 10 in his right hand, with his thumb disposed in thumb recess 11 thereof. He then inserts the pointed extremities of elongate prongs 19 and 20 into the fruit, being careful to maintain prongs 19 and 20 in a true vertical plane, with the tip of upper prong 19 penetrating the fruit adjacent his thumb, at the equator line. The blade 14 is then pushed inwardly into the fruit to its full length until base plate 12 thereof lies flush against the outer surface of the fruit. With plate 12 thus flush against the surface of the fruit it will be seen that reduced prongs 21 and 22 have penetrated the skin of the fruit to their full depth, leaving two slightly enlarged perforations 27 and 28 therein, to the right of the "V-shaped" cut C made by blade 14. The insertion of blade 14 makes an angular cut in the fruit, progressively reducing in extent into the interior of the fruit, due to the forwardly reduced, angular configuration of blade segments 15 and 16.

With the first cut thus centered on the equator of the fruit, the blade 14 and prongs 19–20 and 21–22 are withdrawn from the fruit and the fruit is rotated clockwise toward the operator until the two vertically aligned guide holes 27 and 28 in the skin of the fruit, made therein by short prongs 21 and 22, are directly in front of the operator. The operator then inserts the points of elongate prongs 19 and 20, respectively, into guide holes 27 and 28, made by short prongs 21 and 22, and again forces blade 14 and prongs 19–20 and 21–22 fully into the fruit until base plate 12 is flush against the outer surface thereof.

Again, short prongs 21 and 22 made two guide holes 27 and 28 in the surface of the fruit, to the right of this second cut. The blade is then withdrawn, the fruit is again turned clockwise and elongate prongs 19 and 20 are again inserted into the guide holes left by prongs 21 and 22 and blade 14 is again pushed into the fruit until plate 12 is flush against its outer surface. This operation is repeated progressively around the equator on the fruit until "V-shaped," contiguous and meeting cuts have been made about the entire circumference of the fruit, severing it into two equal hemispheres provided, as shown, with equally fluted, angularly cut edges. At the point of juncture of the line of cuts at the end of the cutting operation, if the cuts do not come out equal, the prongs 19 and 20 may be inserted, as indicated, in the last guide holes 27 and 28 left by guide prongs 21 and 22 and a final cut made without interrupting the symmetry of the peripheral cut.

It will be noted also that due to the length of blade 14, which is preferably on the order of three to four inches, the inward penetration of each of the cuts made about the equator of the fruit or melon will extend at least to the geometric center of the fruit or melon, whereby when the peripheral line of cuts is completed about the equator of the fruit or melon it will be completely severed into two equal hemispheres.

Referring to FIG. 2, it will be seen that prongs 19 and 20 are disposed in a vertical plane parallel to the vertical plane through the median line 18 of blade 14 and are vertically aligned, as shown, beneath the rear, left hand base corner 16' of blade 14. Prongs 21 and 22 are also vertically aligned in a vertical plane parallel to the plane of prongs 19 and 20 and are vertically aligned beneath the rear, right hand corner 15' of blade 14, where it meets plate 12. Thus, prongs 19–20 and 21–22 lie in parallel vertical planes defining the limits of the cut made by the rear, or widest section of blade 14. Thus, when prongs 19–20 are inserted into holes 27 and 28 made by prongs 21 and 22 and the blade is fully seated in the fruit, the cut made will "meet" the upper end of the previous cut and be contiguous therewith.

Referring to FIG. 6, it will be noted that upon the start of the cutting operation the points of prongs 19 and 20, which are held in true vertical position, are first inserted in the skin of the fruit, the point of upper prong 19 being inserted on the equator of the fruit and making perforation 25, prong 20 making perforation 26. The point 17 of the blade 14 then enters the fruit, forming the apex of "V-shaped" cut C. When the blade has penetrated the fruit to about three fourths of its length the points of guide prongs 21 and 22 penetrate the skin of the fruit, making guide perforations 27 and 28, respectively therein. Perforation 27 is on the equator of the fruit and the two guide perforations 27 and 28 lie in a vertical plane to the right of cut C, parallel to the vertical plane of perforations 25 and 26. After the cut has been completed and blade 14 has been forced completely into the center of the fruit so that base plate 12 thereof is flush against the surface of the fruit, the blade 14 is completely withdrawn from the fruit, leaving initial "V-shaped" cut C and guide holes 27 and 28 therein, to the right of cut C and vertically aligned under its upper, right extremity. The fruit is then rotated clockwise until guide holes 27 and 28 are in front of the operator. The points of elongate prongs 19 and 20 are then inserted into guide holes 27 and 28, respectively, and blade 14 is again forced completely into the fruit to its base plate 12, guide prongs 21 and 22 again leaving appropriate guide holes 27 and 28 spaced to the right of this second cut and vertically aligned under its upper, right hand extremity. The operation is repeated progressively about the entire circumference of the fruit until the halves are completely severed, as shown in FIG. 7. It will be seen that due to the provision of elongate prongs 19 and 20 and guide prongs 21 and 22, aligned in parallel vertical planes, respectively, to the left side and right side of blade 14 and under its left and right, rear extremities 16' and 15', respectively, that once the initial cut C has been made in the fruit, with elongate prongs 19 and 20 properly aligned in a true vertical plane, with upper prong 19 penetrating the fruit at its equator line, by repeating the operation, as aforesaid, an accurately aligned series of contiguous and meeting angular cuts will be made about the entire equator of the fruit and the alignment of these cuts will be maintained accurately about the equator of the fruit.

As aforesaid, it is important that in making the first cut the point of upper elongate prong 19 be inserted in the fruit on the equator line thereof and that the operator be careful to maintain elongate prongs 19 and 20 in a true vertical plane with respect thereto. From then on, it is merely necessary to progressively move prongs 19 and 20 to the right to the next set of guide holes 27 and 28 to maintain the peripheral cut accurately aligned about the entire equator of the fruit.

As elongate prongs 19 and 20 are vertically aligned in a vertical plane parallel to the vertical plane through the axis or median line 18 of blade 14 and as guide prongs 21 and 22 are also vertically aligned in a plane parallel to the plane of the blade axis and to the vertical plane of elongate prongs 19 and 20, as soon as the first cut C has been made at the equator of the fruit, by merely progressively inserting the points of guide prongs 19 and 20 into succeeding guide holes 27 and 28, as the fruit is rotated clockwise, an accurate circumferential series of V-shaped, contiguous cuts about the equator of the fruit is assured.

It is recognized that angularly blade knives, somewhat analogous to the present knife, designed to make triangular cuts, are known in the art. The novelty of the present invention resides in the combining of such an angular blade with the short guide prongs and elongate aligning prongs disposed in parallel vertical planes laterally of the angular cutting blade and vertically aligned under its rear corners.

It will be appreciated that, while the present knife is designed primarily to separate substantially spherical fruit and melons into equal hemispheres with evenly fluted, angularly cut edges, it may also be used above the equator of the fruit or melon to divide the fruit into an enlarged lower portion and smaller upper portion, if desired. It may also be used to remove only the extreme upper portion of a fruit or melon, where desired, and, regardless of its vertical positioning with respect to the equator of the object being cut will still provide a uniform, fluted cut about the entire circumference of the fruit or melon.

When using the knife, aligning prongs 19 and 20 and guide prongs 21 and 22 must fully penetrate the surface of the fruit until plate 12 at the base of the blade and prong structure bears flush against the outer surface thereof.

By disposing parallel guide prongs 21 and 22 with respect to one side of blade 14 in the precisely analogous position in which elongate prongs 19 and 20 are positioned at the opposite side of blade 14 and by virtue of the fact that guide prongs 21-22 and elongate prongs 19-20 are disposed, respectively, in vertical planes passing through the rear, upper corners 15' and 16' of blade 14, by utilizing the holes 27 and 28 made by guide prongs 21 and 22 as the next insertion points for prongs 19 and 20 a uniform, contiguous series of cuts about the entire periphery of the fruit is assured.

As previously stated, the operator should be careful that elongate prongs 19 and 20 lie in a true vertical plane before inserting them and point 17 of blade 14 in the skin of the fruit or melon. If prongs 19 and 20 are not properly vertically aligned an irregular cut about the fruit or melon will result.

It will thus be seen that with comparatively little practice even an unskilled operator using this knife may readily divide a spherical fruit or melon into two equal hemispheres while providing about the cut surfaces of each an absolutely uniform, angular serrated decorative edge.

The invention is susceptible of numerous embodiments without department from the spirit thereof. Thus, the length of blade 14, prongs 19 and 20 and guide prongs 21 and 22 may be varied at will, depending upon the size of the fruit or melon to be operated upon. They may be increased in length or proportionately decreased within the spirit of the invention.

The method of attaching the entire unit to the handle may be varied as desired and the knife may be made with a number of interchangeable blade and prong assemblies for attachment to the handle 10 to make the unit readily adaptable to fruit or melons of widely divergent sizes.

In place of guide prongs 21 and 22 a rectilinear blade could be substituted for the guidance of elongate prongs 19 and 20 on the next succeeding cut.

This specification is by way of illustration of one embodiment of the invention only. Attention is directed to the appended claims for a limitation of the scope of this invention.

What is claimed is:

1. In a knife, a handle, an angular, outwardly reduced blade comprising two triangular blade segments rectangularly disposed to each other on a common median line longitudinally affixed to one extremity of said handle and extending outwardly therefrom on the axis thereof, a pair of short parallel guide prongs disposed at one side of said blade in a vertical plane parallel to the vertical plane through the median line of said blade and intersecting one rear corner of said blade, a pair of elongate parallel prongs disposed at the opposite side of said blade in a vertical plane parallel to the vertical plane of said short prongs intersecting the opposite, rear corner of said blade and lying in the same horizontal planes, respectively, as said guide prongs whereby when said blade is fully seated in an article to be cut said guide prongs will penetrate the article in the same relative position as said elongate prongs, and will serve as a guide therefor on the next cut.

2. In a knife, a handle, an angular, outwardly reduced blade comprising two triangular blade segments rectangularly disposed to each other on a common median line longitudinally affixed to one extremity of said handle and extending outwardly therefrom on the axis thereof, a pair of short parallel guide prongs disposed at one side of said blade in a vertical plane parallel to the vertical plane through the median line of said blade and intersecting one rear corner of said blade, a pair of elongate parallel prongs of about four times the length of said guide prongs disposed at the opposite side of said blade in a vertical plane parallel to the vertical plane of said short prongs intersecting the opposite, rear corner of said blade and lying in the same horizontal planes, respectively, as said guide prongs whereby when said blade is fully seated in an article to be cut said guide prongs will penetrate the article in the same relative position as said elongate prongs, and will serve as a guide therefor on the next cut.

3. In an angularly bladed knife, a handle, an outwardly reduced, angular blade comprising two triangular blade segments rectangularly disposed to each other on a common median line extending longitudinally from the forward extremity of said handle on the axis of said handle, a pair of elongate, parallel prongs disposed at the left hand side of said blade lying in a vertical plane parallel to the vertical plane through the median line of said blade and intersecting the rear, left hand corner of said blade, a pair of shortened parallel prongs disposed at the right hand side of said blade lying in a vertical plane parallel to the vertical plane of said elongate prongs and intersecting the rear, right hand corner of said blade whereby when said blade is fully seated in an item to be cut said short prongs will provide two vertically disposed guide holes in the surface of the item for subsequent insertion of said elongate prongs to insure even and contiguous angular cuts about the periphery of the item being cut by the knife.

References Cited by the Examiner
UNITED STATES PATENTS 1,117,355 11/14 Erikson _____ 30—24
1,638,956  8/27 Pinchbeck et al. _____ 30—24

WILLIAM FELDMAN, *Primary Examiner.*

MILTON S. MEHR, *Examiner.*